United States Patent
Kashiwagi

(10) Patent No.: US 6,580,681 B1
(45) Date of Patent: Jun. 17, 2003

(54) OPTICAL DISK WITH INFORMATION SIGNAL REPRESENTING A CHARACTER, METHOD AND APPARATUS

(75) Inventor: Toshiyuki Kashiwagi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/368,012

(22) Filed: Aug. 3, 1999

(30) Foreign Application Priority Data

Aug. 10, 1998 (JP) .......................................... 10-226036

(51) Int. Cl.[7] ................................................ G11B 7/24
(52) U.S. Cl. .................................. 369/275.3; 369/275.4
(58) Field of Search .......................... 369/275.3, 275.4, 369/275.1, 277, 278, 279, 13.09, 44.29, 13.32, 44.13, 59.14, 44.35, 55.22, 53.23, 47.48

(56) References Cited

U.S. PATENT DOCUMENTS

| | | | | |
|---|---|---|---|---|
| 5,754,522 A | * | 5/1998 | Kobayashi et al. | 369/275.3 |
| 5,844,882 A | * | 12/1998 | Yoshida et al. | 369/275.4 |
| 5,844,883 A | * | 12/1998 | Kanno et al. | 369/275.4 |
| 5,940,364 A | * | 8/1999 | Ogata et al. | 369/275.4 |
| 6,069,870 A | * | 5/2000 | Maeda et al. | 369/275.4 |
| 6,115,352 A | * | 9/2000 | Ohno et al. | 369/275.4 |
| 6,240,055 B1 | * | 5/2001 | Takamine et al. | 369/44.29 |
| 6,282,166 B1 | * | 8/2001 | Akiyama et al. | 369/275.3 |
| 6,400,653 B1 | * | 6/2002 | Torazawa et al. | 369/13.02 |
| 6,424,602 B1 | * | 7/2002 | Fujii | 369/13.09 |

* cited by examiner

Primary Examiner—Ali Neyzari
(74) Attorney, Agent, or Firm—Oblon, Spivak, McClelland, Maier & Neustadt, P.C.

(57) ABSTRACT

An optical disk has a groove formed in the direction of a recording track and a first information signal is recorded by forming a row of marks or dots on the groove or land. A second information signal can also be recorded on the groove or land without adversely affecting the playback characteristic of the first information signal. A groove is formed in the direction of the recording track and a row of marks or dots corresponding to the first information signal is formed on the groove or land, so that the first information signal can be recorded. Further, by forming a wave having a spatial frequency higher than a cut-off frequency of a playback optical system corresponding to a second information signal on a part or all of the groove, the second information signal is recorded. The second information signal can represent visible information.

9 Claims, 8 Drawing Sheets

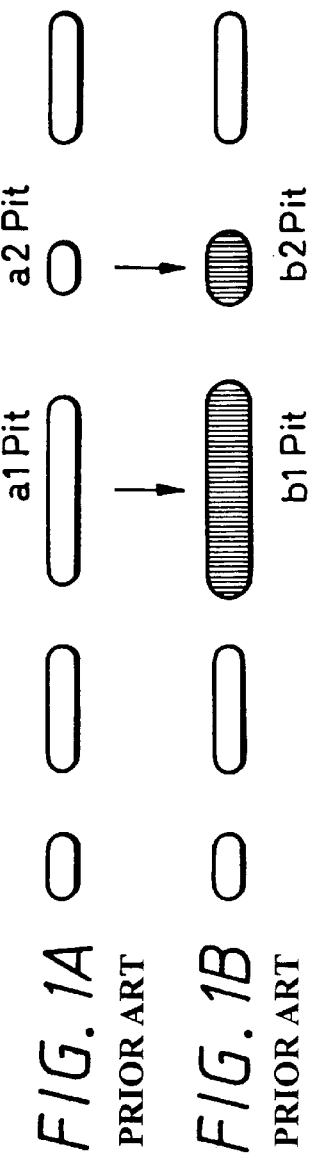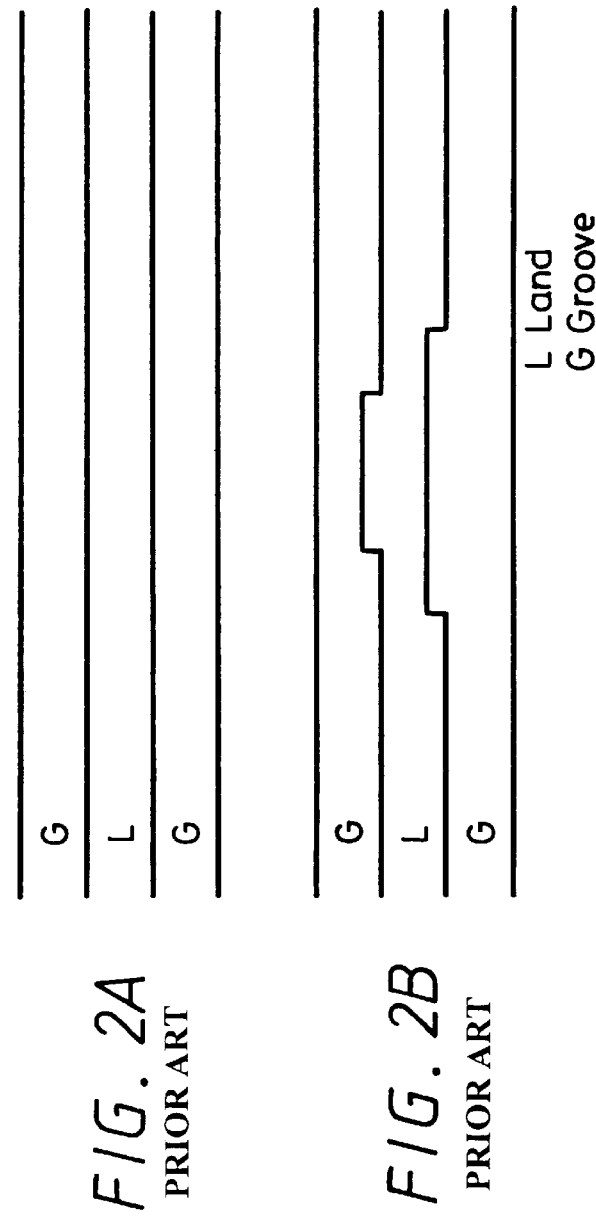
FIG. 1A PRIOR ART
FIG. 1B PRIOR ART
FIG. 2A PRIOR ART
FIG. 2B PRIOR ART L Land
G Groove L Land
G Groove L Land
G Groove L Land G Groove L Land L Land
G Groove

OPTICAL DISK WITH INFORMATION SIGNAL REPRESENTING A CHARACTER, METHOD AND APPARATUS

BACKGROUND OF THE INVENTION

1. Field of the Invention

The present invention relates to an optical disk, a recording method for the optical disk and a production apparatus for a master of the optical disk.

2. Description of the Related Art

Pits in a conventional optical disk dedicated for reproduction will be described with reference to FIGS. 1A and 1B. Pits a1, a2 of FIG. 1A are such pits that the width thereof is constant but they are different in length depending on information signal (modulated information signal). To prevent forgery and to improve commercial value, pits b1, b2 of FIG. 1B record a signal for preventing the forgery or characters, graphic or symbol by changing the width or length of the pits a1, a2 of FIG. 1A. The changing of the width and length of the pits can be carried out by changing an exposure amount on an exposure master disk for the optical disk upon recording.

A groove in a conventional recordable (of course reproducible) optical disk will be described with reference to FIGS. 2A and 2B. An optical disk of FIG. 2A comprises a groove G having a predetermined constant width and a land L having a predetermined constant width between the grooves G, thereby information signal (modulated information signal) being recorded on a bottom of the groove G. An optical disk shown in FIG. 2B indicates a case in which the width of the groove G is changed corresponding to other information signal in the optical disk of FIG. 2A.

Although if the width and length of the pit are changed corresponding to a modulation signal in a playback dedicated optical disk as shown in FIG. 1B, such signal characteristics as a degree of modulation and asymmetry change. However, because the signal standard has a width, there never occurs a practical problem.

Because in a recordable optical disk, its guide groove occupies most area in the recording surface of the optical disk and there are few pits already recorded, the length of the groove cannot be changed in the length direction corresponding to the modulation signal. Therefore, as shown in FIG. 2B, the width of the groove is changed corresponding to the modulation signal. However, in this case, the area of the recording region in an adjacent land changes, thereby affecting the record playback characteristic of information signal in that region badly.

SUMMARY OF THE INVENTION

In views of the above problems, an object of the present invention is to provide an optical disk capable of recording a first information signal by forming a groove in the direction of a recording track and then forming rows of marks or dots on the groove or a land, in which a second information signal can be also recorded without affecting the playback characteristic of the first information signal badly.

Another object of the present invention is to provide an optical disk in which the first information signal is recorded by forming rows of marks or dots on a flat recording surface, wherein it is capable of recording a second information signal without affecting the playback characteristic of the first information signal badly.

Still another object of the present invention is to provide a recording method for an optical disk for recording a first information by forming rows of marks or dots on a flat recording surface, in which it is capable of recording a second information signal without affecting the playback characteristic of the first information signal badly.

A further object of the present invention is to provide an optical disk in which grooves are formed in the direction of the recording track and which is capable of recording an information signal by forming rows of marks or dots on the groove or land corresponding to the information signal, wherein the optical disk is capable of expressing characters, graphic or symbol on its recording surface.

A still further object of the present invention is to provide a production apparatus for a master disk for an optical disk comprising a laser light or beam source and an objective lens for converging the laser beam emitted from the laser beam source and irradiating the same on an exposure master disk and capable of forming groove capable of recording a first information signal by irradiating the converged beam from the objective lens on the exposure master disk so as to form rows of marks or dots on the groove or land, in which the optical disk is also capable of recording a second information signal without affecting the playback characteristic of the first information signal badly.

A yet still another object of the present invention is to provide a production apparatus for a master disk of an optical disk comprising a laser light or beam source and an objective lens for converging the laser beam emitted from the laser beam source and irradiating the same on an exposure master disk and capable of recording a first information signal on the exposure master disk with rows of marks or dots by modulating the laser beam by the first information signal, in which the optical disk is capable of also recording a second information signal without affecting the playback characteristic of the first information signal badly.

To achieve the above objects, according to a first aspect of the invention, there is provided an optical disk containing grooves formed in a direction of a recording track and in which by forming rows of marks or dots corresponding to a first information signal on the groove or land, the first information signal is recorded, wherein a second information signal is recorded at least in part of the groove, wherein the second information signal is recorded by forming a wave having a spatial frequency higher than a cut-off frequency of a playback optical system corresponding to the second information signal, on a part or all of the groove.

In the optical disk of the first aspect of the present invention, by forming the wave having a spatial frequency higher than the cut-off frequency of the playback optical system corresponding to the second information signal on a part or all of the groove, the second information signal is recorded.

According to a first aspect of the present invention, there is provided an optical disk containing grooves formed in a direction of a recording track and in which by forming row of marks or dots corresponding to a first information signal on the groove or land, the first information signal is capable of being recorded, wherein a second information signal is recorded by forming a wave having a spatial frequency higher than a cut-off frequency of a playback optical system corresponding to the second information signal on a part or all of the groove.

According to a second aspect of the present invention, there is provided an optical disk in which by forming rows of marks or dots on a flat recording surface, a first information signal is recorded, wherein a second information signal is recorded by waving a part of marks or dots in the row of marks or dots or all of the marks or dots corresponding to the second information signal at a spatial frequency higher than the cut-off frequency of a playback optical system.

According to a third aspect of the present invention, there is provided a recording method for an optical disk for recording a first information signal by forming rows of marks or dots on a flat recording surface having a step for recording a second information signal by waving a part of marks or dots in the row of marks or dots or all of the marks or dots in correspondence with the second information signal at a spatial frequency higher than the cut-off frequency of a playback optical system.

According to a fourth aspect of the present invention, there is provided an optical disk according to the first aspect of the invention, wherein a wave is formed on a part of the groove and an average of the width of a part of the groove having the wave is substantially the same as an average of the width of a part of the groove without the wave.

According to a fifth aspect of the present invention, there is provided an optical disk according to the first aspect of the present invention, wherein a wave is formed in a part of the groove and the second information signal is recorded corresponding to absence or presence of the wave of the groove.

According to a sixth aspect of the present invention, there is provided an optical disk according to the first aspect of the present invention, wherein the second information signal is recorded by changing an amplitude of the wave of the groove to two or more stages.

According to a seventh aspect of the present invention, there is provided an optical disk according to the second aspect of the present invention, wherein the wave is partially formed on a part marks or dots in the row of marks or dots or all of the marks or dots and the second information signal is recorded corresponding to absence or presence of the wave of the mark or dot.

According to an eighth aspect of the present invention, there is provided an optical disk according to the second aspect of the present invention, wherein the second information signal is recorded by changing the amplitude of the wave in a part of marks or dots in the row of the marks or dots or all of the marks or dots at two or more stages.

According to a ninth aspect of the present invention, there is provided a recording method for an optical disk according to the third aspect of the present invention, wherein the wave is partially formed on a part of marks or dots in the row of marks or dots or all of the marks or dots and the second information signal is recorded corresponding to absence or presence of the wave of the mark or dot.

According to a tenth aspect of the present invention, there is provided a recording method for an optical disk according to the third aspect of the present invention, wherein the second information signal is recorded by changing the amplitude of the wave in a part of marks or dots in the row of the marks or dots or all of the marks or dots at two or more stages.

According to an eleventh aspect of the present invention, there is provided an optical disk containing grooves formed in a direction of a recording track and in which by forming rows of marks or dots corresponding to an information signal on the groove or land, the information signal capable of being recorded, wherein a wave for expressing characters, graphic or symbol is formed in a part or all of the groove.

According to a twelfth aspect of the present invention, there is provided a production apparatus for a master disk for an optical disk comprising a laser light or beam source and an objective lens for converging a laser beam emitted from the laser beam source and irradiating the same on an exposure master disk so as to form rows of marks or dots on the groove or land thereby a groove capable of recording a first information signal being formed, the production apparatus further comprising a beam deflector for wobbling the converged beam to be irradiated on the exposure master disk in a direction intersecting a track in accordance with a second information signal, wherein the second information signal is recorded by forming a wave with a spatial frequency higher than the cut-off frequency of the playback optical system on a part or all of grooves in response to the second information signal.

According to a thirteenth aspect of the present invention, there is provided a production apparatus for a master disk for an optical disk comprising a laser light or beam source and an objective lens for converging a laser beam emitted from the laser beam source and irradiating the same on an exposure master disk, in which an first information signal is recorded on the exposure master disk with a row of marks or dots by modulating the laser beam by the first information signal, the production apparatus further comprising a beam deflector for wobbling the converged beam to be irradiated on the exposure master disk in a direction intersecting a track in correspondence with a second information signal, the second information signal being recorded by waving a part of marks or dots in the row of marks or dots or all of the marks or dots corresponding to the second information signal at a spatial frequency higher than the cut-off frequency of a playback optical system.

BRIEF DESCRIPTION OF THE DRAWINGS

FIGS. 1A and 1B are diagrams showing rows of pits in a conventional optical disk;

FIGS. 2A and 2B are diagrams showing grooves in the conventional optical disk;

DETAILED DESCRIPTION OF THE PREFERRED EMBODIMENTS

Figure 3:
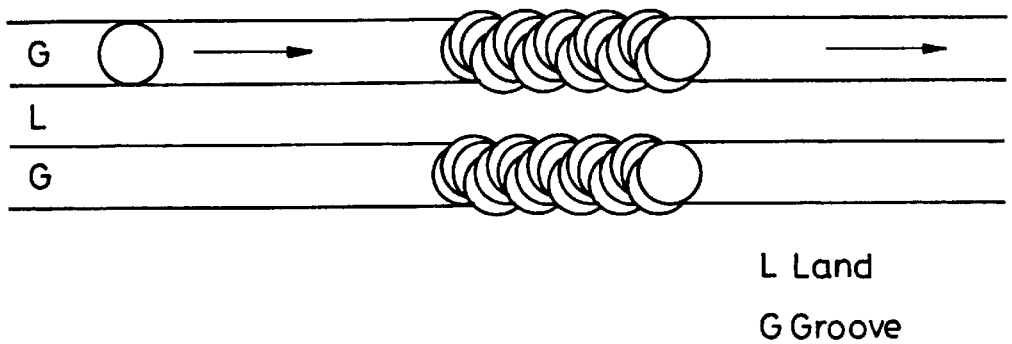
FIG. 3 is a diagram showing grooves in a master of an optical disk according to an example of the embodiment of the present invention.
Figure 4:
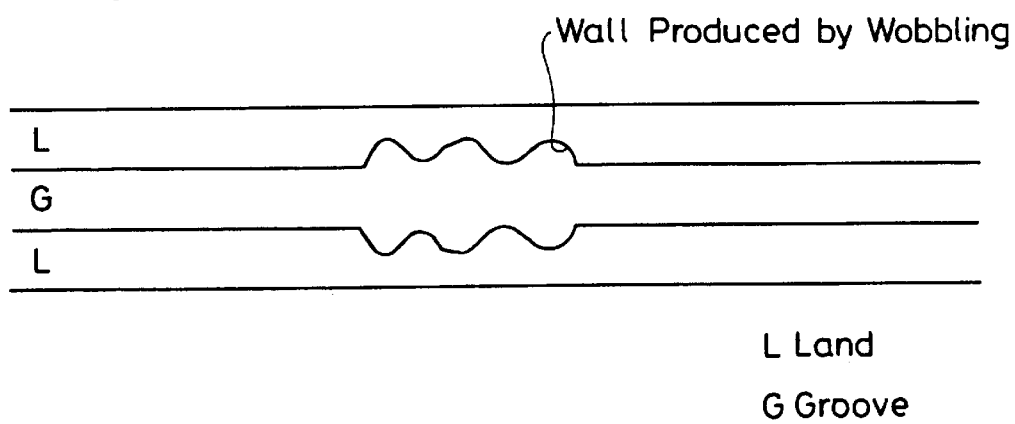
FIG. 4 is a diagram showing grooves in an optical disk according to an example of the embodiment of the present invention.
Figure 5:
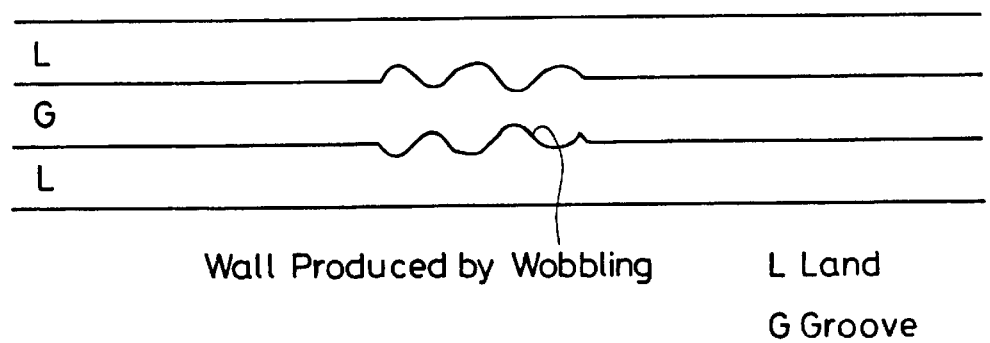
FIG. 5 is a diagram showing grooves in an optical disk according to an example of the embodiment of the present invention.

Hereinafter, the embodiments of the present invention will be described in detail with reference to the accompanying drawings. FIGS. 4 and 5 each show a part of a recordable optical disk. A groove G is formed in the direction of a recording track and with that groove as a guide, a row of pits are formed corresponding to a first information signal on a bottom of the groove G so as to enable the recording or storage of the first information signal. Then, waves are formed in a part (or all section) of the groove G with a spatial frequency higher than cut-off frequency of a playback optical system according to a second information signal so as to record the second information signal (for example, a signal for preventing forgery or the like). In FIGS. 4, 5, L indicates lands located between the groove G and the groove G.

The groove G having such waves is obtained by wobbling a circular spot of a focused laser beam irradiated on a master disk in a direction crossing a track or perpendicular to the track, specifically a radias direction of a circle of a master disk when the master disk of the optical disk is produced. The letter L indicates a land between the groove G and the groove G. Meanwhile, a recording apparatus for the master disk of the optical disk will be described in detail later.

In an optical disk structured to have the land and groove, waves are formed in a part of the groove G. An average of the width of a part of the groove G having the waves has to be equal to the average of the width of a part of the groove G having no waves. That is, to make the average of the width of a part of the groove G having the waves equal to the average of the width of a part of the groove G having no waves, the center of the wave on each of wall faces opposing each other of the groove G has only to agree with each of the opposing wall face having no wave in FIG. 5. By forming the groove G in such a manner, an existence of the groove G does not affect recording/playback signal badly.

FIG. 4 indicates a case in which the center of the wave on each of opposing wall faces of the groove does not agree with each of the opposing wall face having no wave (in this case, the center of the wave on each of the opposing wall faces of the groove G is outside each of the opposing wall face having no wave of the groove G). In this case, the recording and playback signals in the land region may be affected badly.

Although not shown, it is possible to produce an optical disk in which the wave is formed in a part of the groove and a second information signal is recorded corresponding to an existence or absence of the wave in the groove.

Figure 6:
FIG. 6 is a diagram showing grooves according to an example of the embodiment of the present invention.
Figure 6:
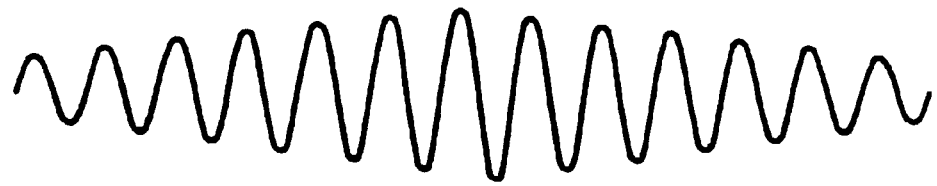
Figure 6:
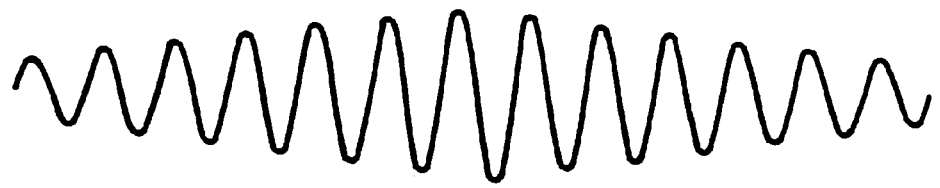
Figure 6:

By changing the amplitude of the wave of the groove G at two steps (three steps or more may be also permissible) as shown in FIG. 6, the second information signal can be recorded in the optical disk.

Figure 7:
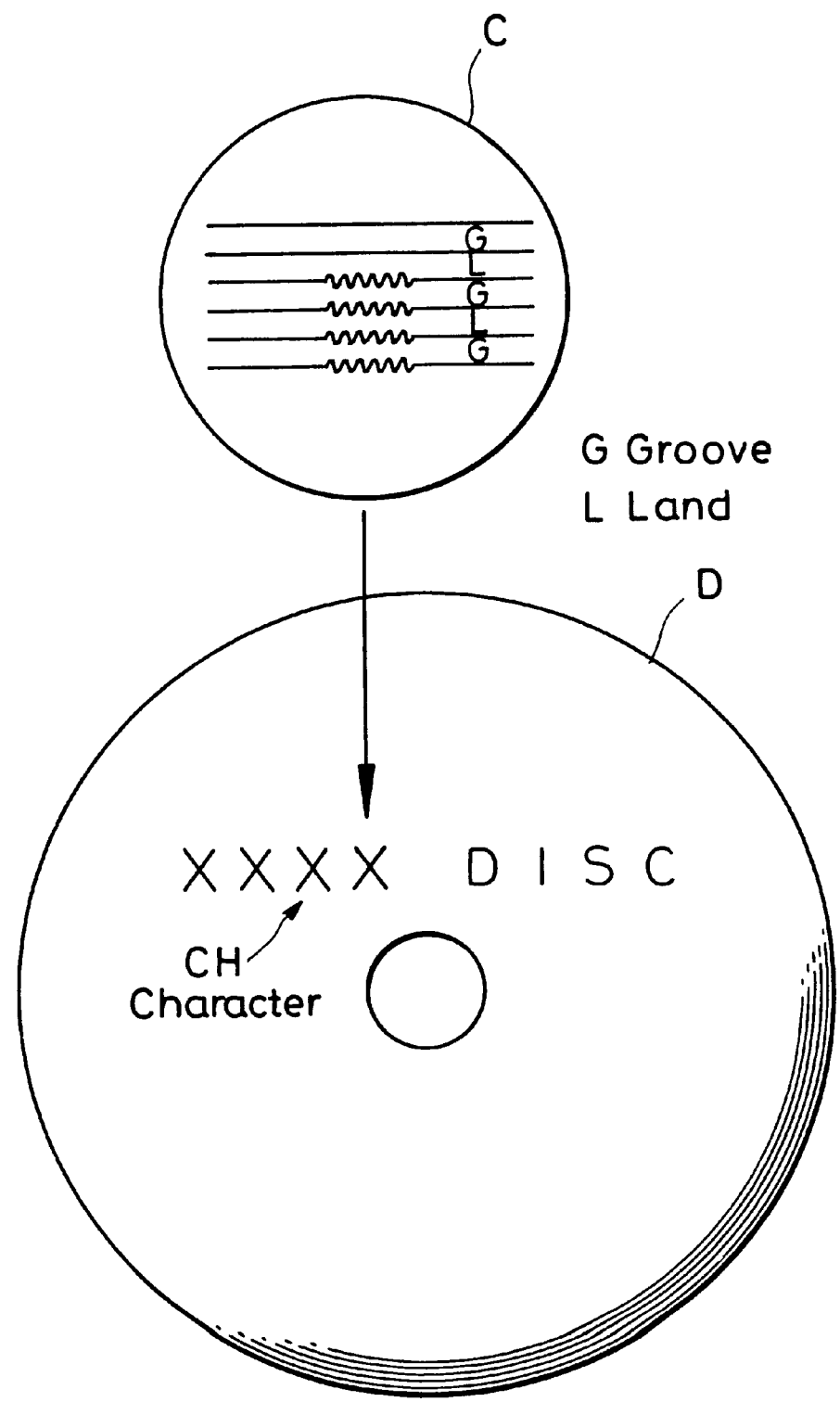
FIG. 7 is a diagram showing characters expressed by grooves in which waves are formed according to an example of the embodiment of the present invention.

As shown in FIG. 7, a character CH (graphic or symbol may also be permitted) can be expressed by waves in the groove G shown in a circle C so as to obtain an optical disk D. In this example, manufacturer's name and "DISC" are expressed by means of the characters CH.

Next, an optical system of a recording apparatus (which can operate as a playback apparatus also) for a master disk of the optical disk will be described with reference to FIG. 8. Reference numeral 1 denotes a laser light or beam source. A laser beam emitted from the laser beam source 1 passes through an electrooptic modulator (EOM) 2 acting as an optical modulator and is made incident on a beam splitter 3 at an incident angle of 45°. A laser beam passing through the beam splitter 3 impinges upon a photo detector 4. A beam detection output of the photo detector 4 is supplied to an automatic output (power) control (APC) circuit 5. A control signal from the automatic output control circuit 5 is supplied to the electrooptic modulator 2 so that a servo is applied to the electrooptic modulator 2 so as to make an optical or light output emitted from the electrooptic modulator 2 constant.

The laser beam reflected by the beam splitter 3 is made incident on a convex lens 6 so that it is converged and then the converged beam impinges upon an acoustooptical modulator (AOM) 7 as an optical modulator so as to be optically modulated by an information signal. The modulated laser beam from the acoustooptical modulator 7 impinges upon a convex lens 8 and is converged. After that, this converged beam impinges on a beam deflector 9, so that the laser beam is wobbled at a high speed by the beam deflector 9 in a direction across a track on an exposure master disk 14 or direction perpendicular thereto (radius direction of master disk 14).

After wobbled by the beam deflector 9, the laser beam passes through a λ/4 (¼ wavelength plate) 10 and is made incident on a beam splitter 11 at an incident angle of 45°. The laser beam passing the beam splitter 11 is made incident on a monitoring photo detector 13. The laser beam reflected by the beam splitter 11 impinges upon an objective lens 12 and is converged thereby. The converged laser beam impinges on the exposure master disk 14 so that it is focused thereon so as to expose the exposure master disk 14 to that laser beam.

In this recording apparatus, by supplying an information signal to the acoustooptical modulator 7, wobbled or not wobbled rows of pits are formed on the exposure master disk 14 according to the information signal or by supplying a groove formation signal to the acoustooptical modulator 7, wobbled or not wobbled grooves are formed.

Next, an example of the beam deflector 9 shown in FIG. 8 will be described with reference to FIGS. 9 to 11. FIG. 9 shows an example in which an acoustooptical deflector (AOD) head 20 is used. This head 20 is driven by an acoustooptical deflector driving circuit 21 supplied with a high frequency deflection signal. After a parallel incident laser beam I is made incident on a wedge prism 22 to be deflected, the deflected laser beam is made incident on the acoustooptical deflector head 20. As a result, an emission laser beam O which vibrates in its advancement direction corresponding to the high frequency deflection signal is emitted from the deflector head 20 and the emission laser beam 20 is incident on a wedge prism 23 so that it is deflected.

Figure 10:
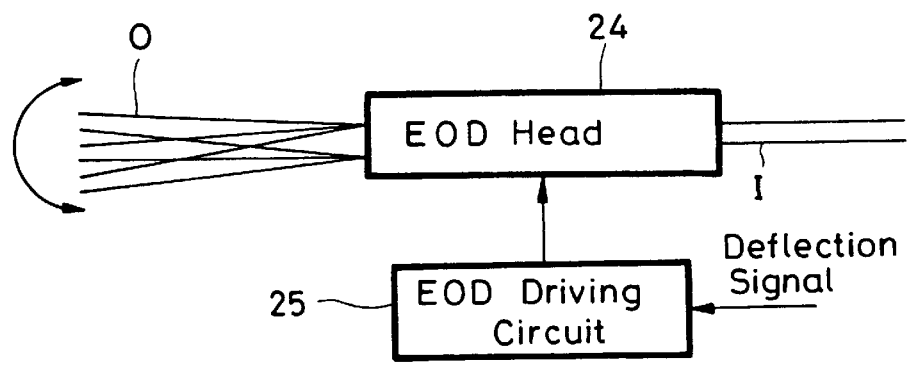
FIG. 10 is a block diagram showing another example of the beam deflector of an optical system of a recording apparatus (recording/playback apparatus)(production apparatus for master of optical disk) according to an example of the embodiment of the present invention.

Next, FIG. 10 shows an example in which an electrooptic deflector (EOD) head 24 is used. This head 24 is driven by an electrooptic deflector driving circuit 25 supplied with a high frequency deflection signal. Then, a parallel incident laser beam I is made incident on one end of this head 24 so as to emit an emission laser beam O vibrated in its advancement direction corresponding to a high frequency deflection signal from the other end of the head 24.

Figure 11:
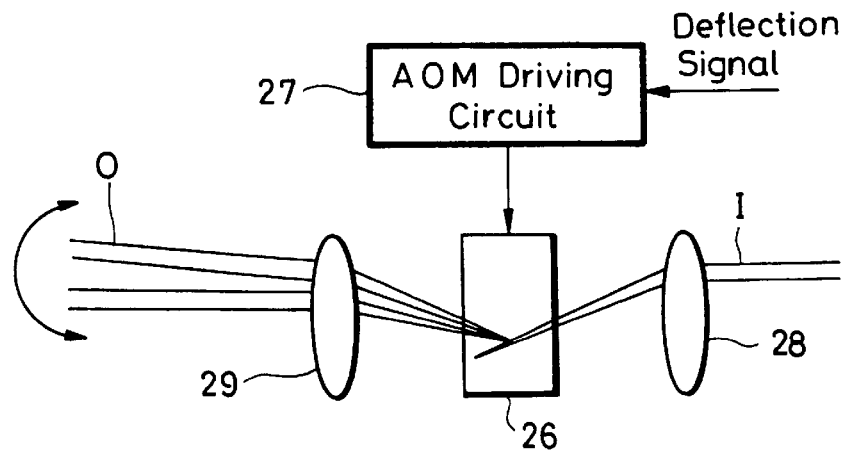
FIG. 11 is a block diagram showing a further example of the beam deflector of an optical system of a recording apparatus (recording/playback apparatus)(production apparatus for master of optical disk) according to an example of the embodiment of the present invention.

FIG. 11 shows a case in which an acoustooptic modulator (AOM) head 26 is used. This head 26 is driven by an acoustooptic deflector driving circuit 27 supplied with a high frequency deflection signal. A parallel incident laser beam I is made incident on a convex lens 28 so as to obtain a converged laser beam. The converged laser beam is made incident on the acoustooptic modulator 26 so as to obtain a divergent laser beam vibrating in its advancement direction corresponding to a high frequency deflection signal from the head 26. The divergent laser beam is made incident on a convex lens 29 so as to obtain a substantially parallel emission laser 0 vibrating in its advancement direction from the lens 29. In this case, the center of the acoustooptic modulator head 26 and a focusing point focused by the convex lens 28 are shifted in a range of 1–20 mm relative to the advancement direction.

Figure 8:
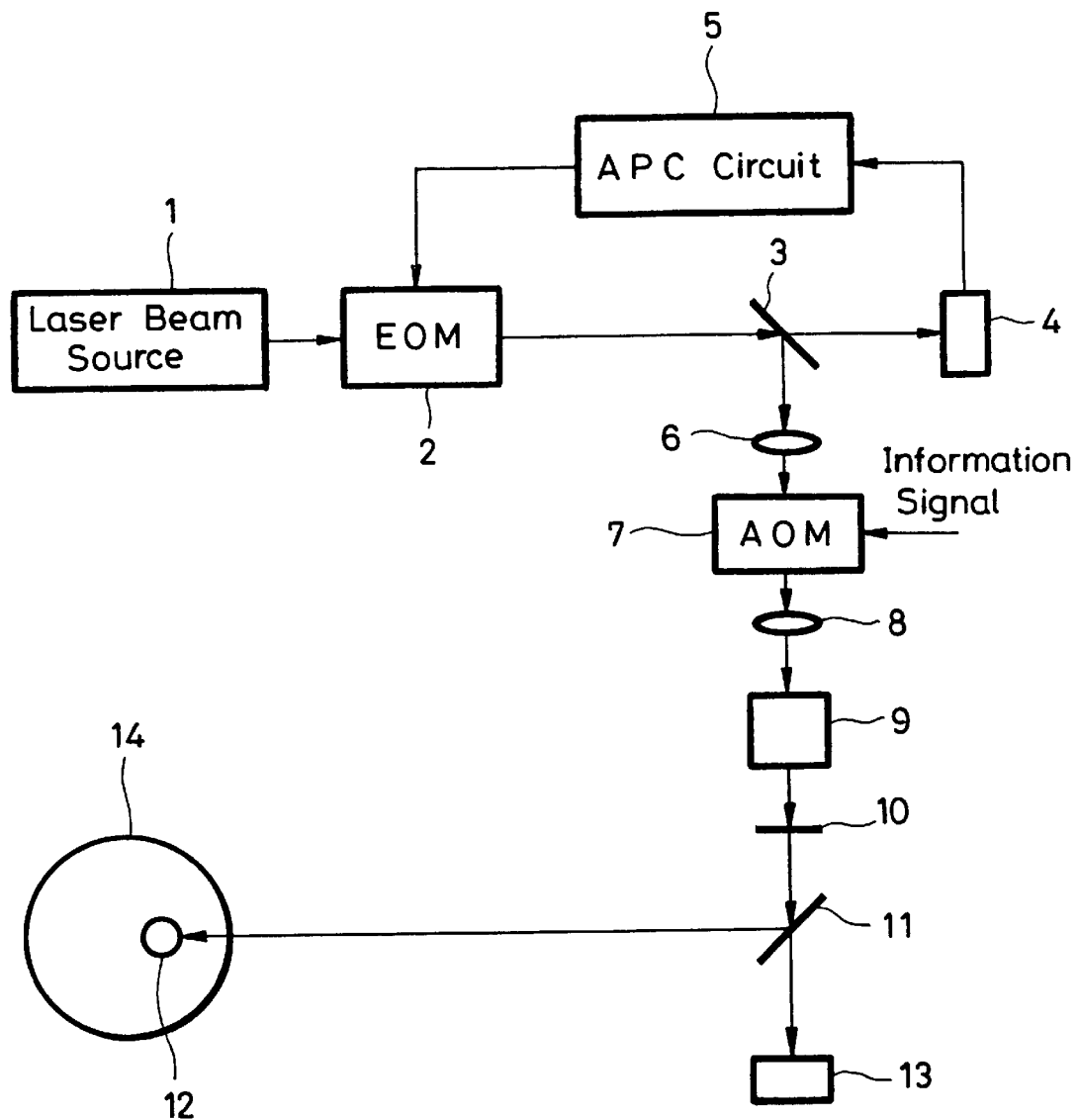
FIG. 8 is a block diagram showing an optical system of a recording apparatus (recording/playback apparatus) (production apparatus for a master of an optical disk) according to an example of the embodiment of the present invention.
Figure 9:
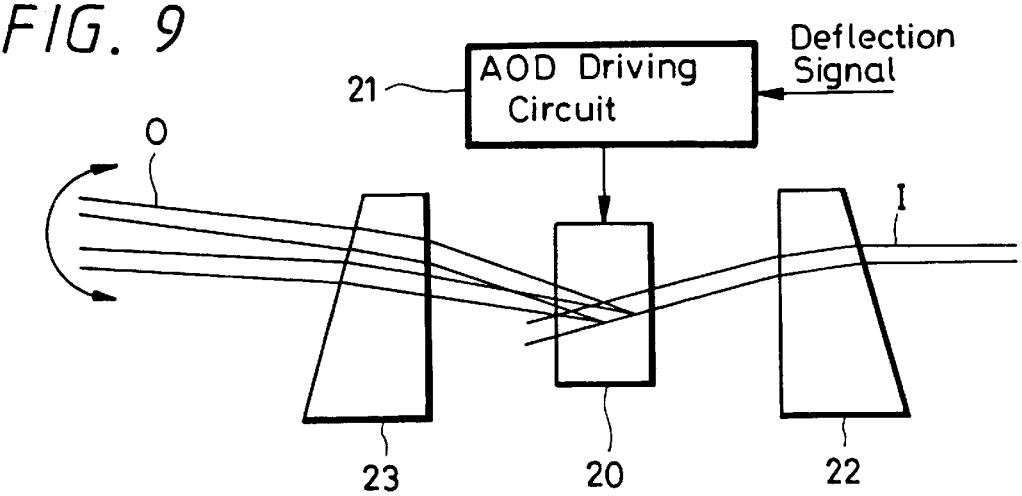
FIG. 9 is a block diagram showing an example of a beam deflector of an optical system of a recording apparatus (recording/playback apparatus)(production apparatus for master of optical disk) according to an example of the embodiment of the present invention.
Figure 12C:
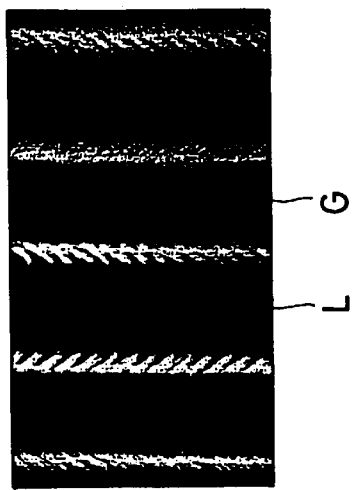
FIGS. 12A, 12B, 12C, 12D, 12E, and 12F are diagrams showing grooves in the master of the optical disk in an enlarged scale.
Figure 12B:
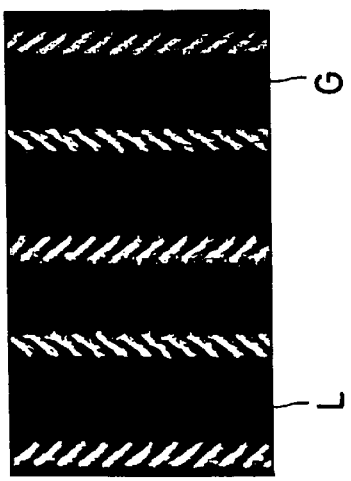
Figure 12A:
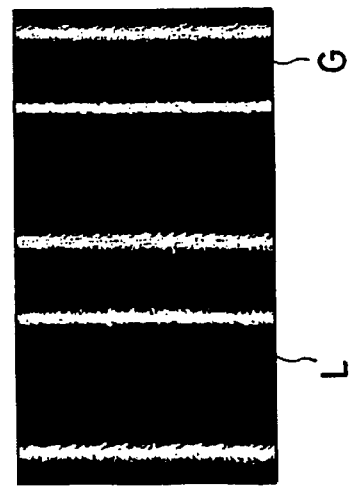

FIGS. 12A, 12B, 12C, 12D, 12E and 12F shows a microscope photograph on the exposure master disk produced by the recording apparatus shown in FIG. 8. In FIGS. 12A, 12B, 12C, 12D; 12E and 12F shows G indicates a groove and L indicates a land, respectively. FIG. 12A indicates a case in which the groove G is not provided with waves. The width of the groove, G is 0.38 $\mu$m. FIG. 12B indicates a case in which a sine wave of ±0.8 V in amplitude and 10 MHz in frequency is inputted to the beam deflector 9 and a recording of 3 m/sec in linear velocity is carried out and here, the groove G having a zigzag wall so that the width thereof being expanded to 0.45 $\mu$m is formed. FIGS. 12C, D, E, and F indicate cases in which a sine wave having an amplitude of ±0.8 V and a frequency of 10 MHz is inputted to the beam deflector 9 and the linear velocity is lowered to 2.5 m/sec, 2.0 m/sec, 1.5 m/sec and 1.0 m/sec. As the linear velocity decreases or the spatial frequency increases, the wall of the groove G becomes smoother so that it comes near a wall provided with no wave.

Figure 12F:
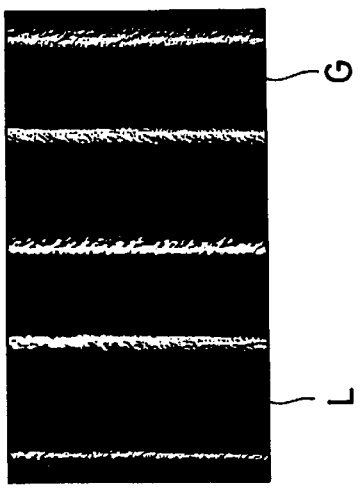
Figure 12E:
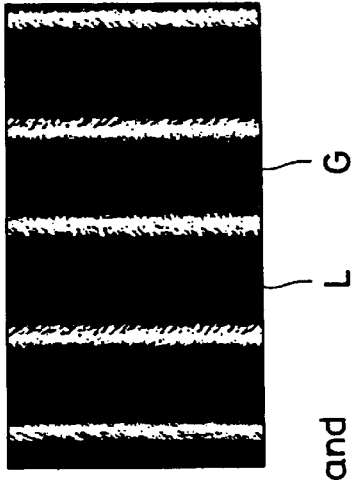
Figure 12D:
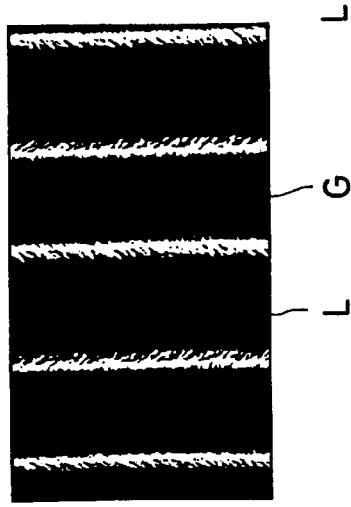

In cases of FIGS. 12B, 12F, a phase changed film was produced on the wall of the groove G and then record and playback experiment was carried out. In any case, completely equal quality signals having a density of 0.21 $\mu$m/bit and a jitter of 8.5% could be recorded and reproduced. As parameters of the record and playback optical system at this time, the wave length of laser beam was 0.65 $\mu$m, the numerical aperture (NA) of an objective lens was 0.85 and the cut-off frequency of the optical system was $2NA/\lambda=$ 2615/mm. On the other hand, the spatial frequency of the wave on the wall of the groove G of FIG. 12B was 10 MHz/3 m/sec=3333/mm and higher enough than the resolution of the optical system. Thus, it was found that the wave of the groove did not affect a reproduced signal of information signal recorded in the groove badly.

Figure 13:
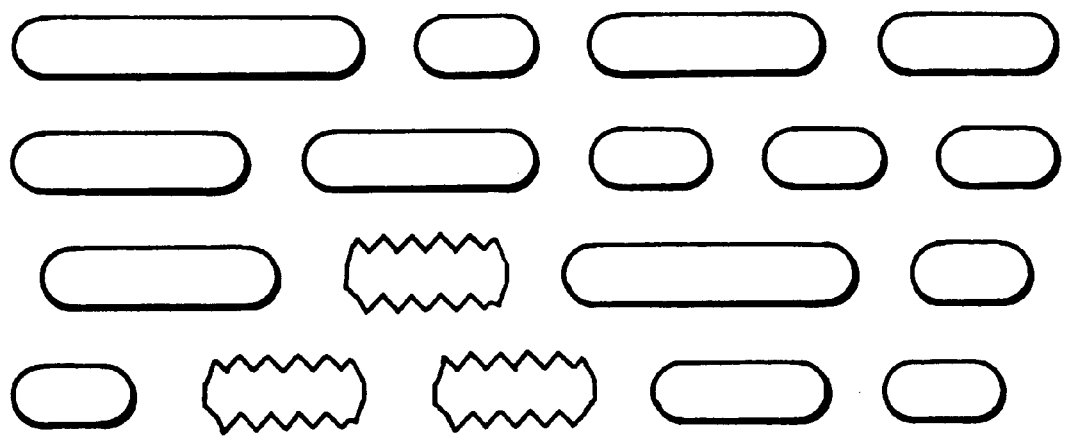
FIG. 13 is a diagram showing rows of pits in the optical disk according to an example of the embodiment of the present invention.

FIG. 13 shows an optical disk (recording method for the optical disk) according to an example of the embodiment of the present invention. By forming rows of pits on a flat recording surface of the optical disk, a first information signal is recorded, and then by wobbling a part of the plural pits (all pits may also be permissible) with a spatial frequency higher than the cut-off frequency of the playback optical system corresponding to a second information signal, the second information signal is recorded.

In this case, it is permissible to record the second information signal corresponding to absence or presence of the wave in the pit.

In this case, by changing the amplitude of the wave of the pit at two or more stages, it is permissible to record the second information signal.

It is also permissible to form the wave in a part of the pits and record the second information signal corresponding to absence or presence of the wave in the pit.

A master disk for an optical disk in which the wave is formed in a part of the pits (or all pits) can be produced by using the optical system of the recording apparatus shown in FIGS. 8 to 11.

According to a first aspect of the present invention, there is provided an optical disk having a groove formed in a direction of a recording track and in which by forming a row of a mark or dot corresponding to a first information signal on the groove or land, the first information signal is capable of being recorded, wherein a second information signal is recorded by forming a wave having a spatial frequency higher than a cut-off frequency of a playback optical system corresponding to the second information signal on a part or all of the groove.

Therefore, it is possible to obtain such an optical disk in which the second information signal can be recorded without badly affecting the reproduction characteristics of the first information signal.

According to a second aspect of the present invention, there is provided an optical disk in which by forming a row of marks or dots on a flat recording surface, a first information signal is recorded, wherein a second information signal is recorded by waving a part of mark or dot in the row of marks or dots or all of the marks or dots corresponding to the second information signal at a spatial frequency higher than the cut-off frequency of a playback optical system.

Therefore, it is possible to obtain such an optical disk in which the second information signal can be recorded without badly affecting the reproduction characteristics of the first information signal.

According to a third aspect of the present invention, there is provided a recording method for an optical disk for recording a first information signal by forming a row of marks or dots on a flat recording surface, in which a second information signal is recorded by waving a part of the marks or dots in the row of marks or dots or all of the marks or dots in correspondence with the second information signal at a spatial frequency higher than the cut-off frequency of a playback optical system.

Therefore, it is possible to obtain such a recording method for an optical disk which can also record the second information signal without badly affecting the reproduction characteristics of the first information signal.

According to a fourth aspect of the present invention, there is provided an optical disk according to the first aspect of the invention, wherein a wave is formed on a part of the groove and an average of the width of a part of the groove having the wave is substantially the same as an average of the width of a part of the groove without the wave.

Therefore, it is possible to obtain such an optical disk having no bad influence on the recording and reproduction of the first information signal on and from the land portion in addition to the effect of the first aspect of the present invention.

According to a fifth aspect of the present invention, there is provided an optical disk according to the first aspect of the present invention, wherein a wave is formed in a part of the groove and the second information signal is recorded corresponding to absence or presence of the wave of the groove.

Therefore, it is possible to obtain such an optical disk in which the second information signal can be recorded without badly affecting the reproduction characteristics of the first information signal.

According to a sixth aspect of the present invention, there is provided an optical disk according to the first aspect of the present invention, wherein the second information signal is recorded by changing an amplitude of the wave of the groove at two or more stages.

Therefore, it is possible to obtain such an optical disk in which the second information signal can be recorded at a multi-level without badly affecting the reproduction characteristics of the first information signal.

According to a seventh aspect of the present invention, there is provided an optical disk according to the second aspect of the present invention, wherein the wave is partially formed on a part of the mark or dot in a row of marks or dots or all of the marks or dots and the second information signal is recorded corresponding to absence or presence of the wave of the mark or dot.

Therefore, it is possible to obtain such an optical disk in which the second information signal can be recorded without badly affecting the reproduction characteristics of the first information signal.

According to an eighth aspect of the present invention, there is provided an optical disk according to the second aspect of the present invention, wherein the second information signal is recorded by changing the amplitude of the wave in a part of the marks or dot in the row of the marks or dots or all of the marks or dots at two or more stages.

Therefore, it is possible to obtain such an optical disk which can also record the second information signal at a multi-level without badly affecting the reproduction characteristics of the first information signal in addition to the effect of the third aspect of the present invention.

According to a ninth aspect of the present invention, there is provided a recording method for an optical disk according to the third aspect of the present invention, wherein the wave is partially formed on a part of mark or dot in the row of marks or dots or all of the marks or dots and the second information signal is recorded corresponding to absence or presence of the wave of the mark or dot.

Therefore, it is possible to obtain such a recording method for an optical disk which can also record the second information signal without badly affecting the reproduction characteristics of the first information signal.

According to a tenth aspect of the present invention, there is provided a recording method for an optical disk according to the third aspect of the present invention, wherein the second information signal is recorded by changing the amplitude of the wave in a part of marks or dots in the row of the marks or dots or all of the marks or dots at two or more stages.

Therefore, it is possible to obtain such a recording method for an optical disk which can also record the second information signal without badly affecting the reproduction characteristics of the first information signal.

According to an eleventh aspect of the present invention, there is provided an optical disk having a groove formed in a direction of a recording track and in which by forming a row of marks or dots corresponding to an information signal on the groove or land, the information signal capable of being recorded, wherein a wave for expressing a character, graphic or symbol is formed in a part or all of the groove.

Therefore, it is possible to obtain an optical disk which can display a character, graphic or symbol on the recording face side of the optical disk.

According to a twelfth aspect of the present invention, there is provided a production apparatus for a master disk for an optical disk comprising a laser light or beam source and an objective lens for converging a laser beam emitted from the laser beam source and irradiating the same on an exposure master disk so as to form a row of marks or dots on the groove or land thereby a groove capable of recording a first information signal being formed, the production apparatus further comprising a beam deflector for wobbling the converged beam to be irradiated on the exposure master disk in a direction intersecting a track in accordance with a second information signal, wherein the second information signal is recorded by forming a wave with a spatial frequency higher than the cut-off frequency of the playback optical system on a part or all of the groove in response to the second information signal.

Therefore, it is possible to provide a production apparatus for a master disk for an optical disk which can also record the second information signal without badly affecting the reproduction characteristics of the first information signal.

According to a thirteenth aspect of the present invention, there is provided a production apparatus for a master disk for an optical disk comprising a laser light or beam source and an objective lens for converging a laser beam emitted from the laser beam source and irradiating the same on an exposure master disk, in which an first information signal is recorded on the exposure master disk with a row of marks or dots by modulating the laser beam by the first information signal, the production apparatus further comprising a beam deflector for wobbling the converged beam to be irradiated on the exposure master disk in a direction intersecting a track in correspondence with a second information signal, the second information signal being recorded by waving a part of the marks or dots in the row of marks or dots or all of the marks or dots corresponding to the second information signal at a spatial frequency higher than the cut-off frequency of a playback optical system.

Therefore, it is possible to provide a production apparatus for a master disk for an optical disk which can also record the second information signal without badly affecting the reproduction characteristics of the first information signal.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical disk in which a groove is formed in a direction of a recording track, and by forming a mark or dot corresponding to a first information signal on the groove or land, the first information signal is recorded, comprising:
   a second information signal recorded on at least a part of the groove,
   wherein the second information signal is recorded by forming a wave having a spatial frequency higher than a cut-off frequency of a playback optical system for reproducing the first information signal on at least a part of the groove, and
   wherein the second information signal represents visible information.

2. An optical disk according to claim 1, wherein a wave is formed on a part of the groove and an average of the width of a part of the groove having the wave is substantially the same as an average of the width of a part of the groove having no wave.

3. An optical disk according to claim 1, wherein a wave having an amplitude of a first magnitude and a wave having an amplitude of a second magnitude different from the first magnitude are formed on the groove.

4. An optical disk in which by forming a row of a mark or dot on a recording surface, a first information signal is recorded, comprising:

a second information signal recorded on at least one mark or dot constituting the row of the mark or dot, wherein the second information signal is recorded by forming a wave having a spatial frequency higher than a cut-off frequency of a playback optical system for reproducing the first information signal on at least one mark or dot constituting the row of the mark or dot, and wherein the second information signal represents visible information.

5. An optical disk according to claim 4, wherein a wave having an amplitude of a first magnitude and a wave having an amplitude of a second magnitude different from the first magnitude are formed on the mark or dot.

6. A recording method for an optical disk for recording a first information signal by forming a row of a mark or dot on a recording surface, comprising:

a step for recording a second information signal on at least one mark or dot constituting a row of the mark or dot, wherein the second information signal is recorded by forming a wave having a spatial frequency higher than a cut-off frequency of a playback optical system for reproducing the first information signal on at least one mark or dot constituting the row of mark or dot, and wherein the second information signal represents visible information.

7. A recording method for an optical disk according to claim 6, wherein a wave having an amplitude of a first magnitude and a wave having an amplitude of a second magnitude different from the first magnitude are formed on the mark or dot.

8. A production apparatus for a master disk for an optical disk comprising a laser beam source and an objective lens for converging a laser beam emitted from the laser beam source and in which a converged beam emitted from the objective lens is irradiated on an exposure master disk to thereby form a groove or a land on the exposure master disk, comprising:

a beam deflector for wobbling the converged beam irradiating the exposure master disk in a direction intersecting the groove or land, wherein a wave formed on the groove or land by the wobbling has a spatial frequency higher than a cut-off frequency of a playback optical system for reproducing information from an optical disk to be produced by using the master disk, and wherein the wave represents visible information.

9. A production apparatus for a master disk for an optical disk comprising a laser beam source and an objective lens for converging a laser beam emitted from the laser beam source and in which a converged beam emitted from the objective lens is irradiated on an exposure master disk to thereby form a row of a mark or dot on the exposure master disk, comprising:

a beam deflector for wobbling the converged beam irradiating the exposure master disk in a direction intersecting the row of the mark or dot, wherein a wave formed on the groove or land by the wobbling has a spatial frequency higher than a cut-off frequency of a playback optical system for reproducing information from an optical disk to be produced by using the master disk, and wherein the wave represents visible information.

\* \* \* \* \*